United States Patent
Tanida

(10) Patent No.: US 10,260,635 B2
(45) Date of Patent: Apr. 16, 2019

(54) SEALING DEVICE

(71) Applicant: NOK CORPORATION, Tokyo (JP)

(72) Inventor: Masayuki Tanida, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/674,172

(22) Filed: Aug. 10, 2017

(65) Prior Publication Data
US 2018/0045318 A1 Feb. 15, 2018

(30) Foreign Application Priority Data

Aug. 12, 2016 (JP) .................. 2016-159021

(51) Int. Cl.
F16J 15/32 (2016.01)
F16J 15/44 (2006.01)
F16J 15/00 (2006.01)
F16J 15/3204 (2016.01)
F16J 15/3244 (2016.01)
F16J 15/3264 (2016.01)

(52) U.S. Cl.
CPC ........... *F16J 15/443* (2013.01); *F16J 15/002* (2013.01); *F16J 15/3204* (2013.01); *F16J 15/3244* (2013.01); *F16J 15/3264* (2013.01)

(58) Field of Classification Search
CPC ...... F16J 15/443; F16J 15/002; F16J 15/3204; F16J 15/3244; F16J 15/3264
See application file for complete search history.

(56) References Cited

U.S. PATENT DOCUMENTS

| 4,844,485 A * | 7/1989 | Antonini ................ F16J 15/164 |
| | | 277/553 |
| 7,891,670 B2 * | 2/2011 | Alajbegovic ........ F16J 15/3244 |
| | | 277/549 |
| 2014/0265144 A1 * | 9/2014 | Kellar .................. F16J 15/3204 |
| | | 277/402 |

FOREIGN PATENT DOCUMENTS

JP   H0357563   6/1991

* cited by examiner

*Primary Examiner* — Gilbert Y Lee
(74) *Attorney, Agent, or Firm* — Harness, Dickey & Pierce, P.L.C.

(57) ABSTRACT

A sealing apparatus for sealing between a rotary shaft 11 and a housing 12 that can be rotated relative to each other, having a circular ring body 3 provided on the rotary shaft 11 and a seal lip body 6 made of a flexible material provided on the housing 12, wherein the seal lip body 6 has a discharge fin 8 on the outer peripheral side of a sealing part 6a which makes sliding contact with the circular ring body 3, and when the two members 11 and 12 rotate relative to each other, the surface of the discharge fin 8 on the side advancing relative to the circular ring body 3 composes an inclined surface receding more on the front edge side than the base end side of the discharge fin 8, and by this inclined surface, oil is discharged away from the sealing portion 6a.

3 Claims, 10 Drawing Sheets

SEALING DEVICE

CROSS-REFERENCE TO RELATED APPLICATIONS

This application claims the benefit and priority of Japanese Application No. 2016-159021, filed Aug. 12, 2016. The entire disclosure of the above application is incorporated herein by reference.

FIELD

The present disclosure relates to a sealing apparatus, and in more detail, relates to a sealing apparatus capable of achieving sufficient sealing without providing a spiral discharge groove in a circular ring body configuring a sealing portion.

BACKGROUND

Figure 12:
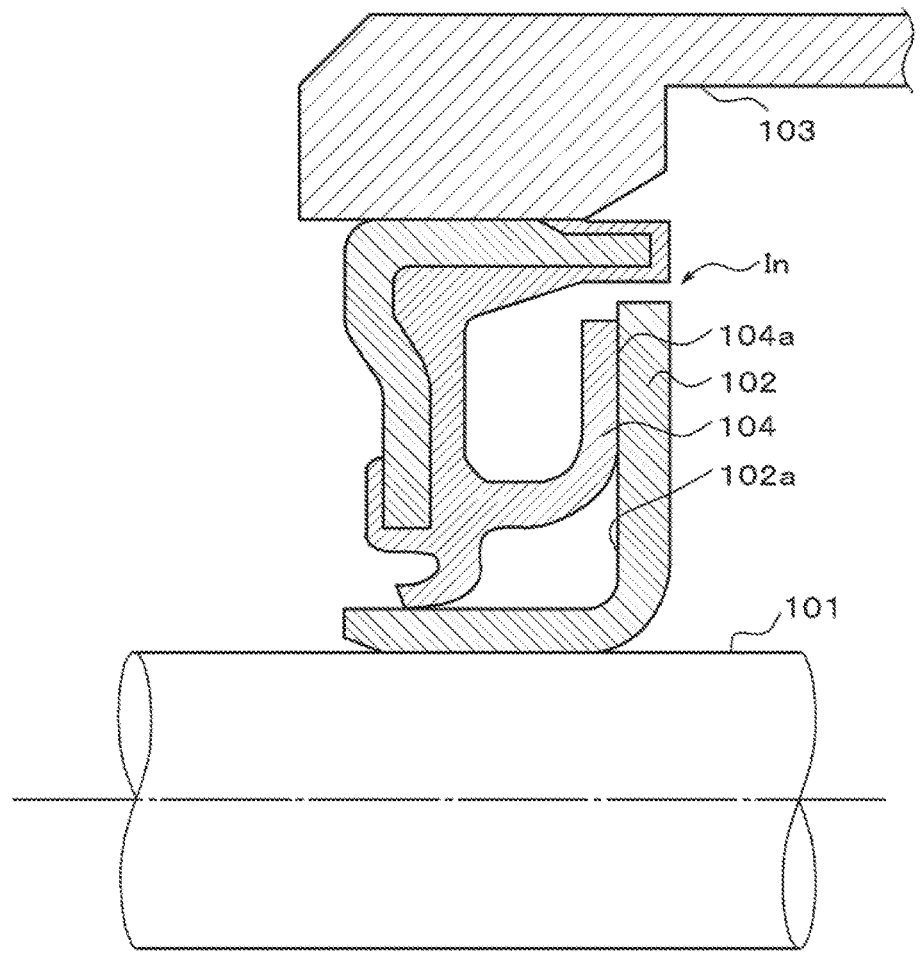

Conventionally, in a sealing apparatus (oil seal) for sealing gas or liquid between two members that can rotate relative to each other, such as a crankshaft, a transmission, a differential gear and the like of a vehicle, as illustrated in FIG. 12, those provided with a circular ring body (slinger) 102 fixedly attached to one member 101 and an annular seal lip body 104 fixedly attached to another member 103, and in a configuration where the seal lip body 104 and a main surface portion 102a of the circular ring body 102 have sliding contact, are known (patent literature 1). The circular ring body 102 is made of a hard material such as a metal, and the seal lip body 104 is made of a flexible material such as a rubber material.

In this sealing apparatus, the sliding contact surface between the circular ring body 102 and the seal lip body 104 serves as a sealing portion 104a, and entry of oil or the like into the sealing portion 104a is blocked. Moreover, in this sealing apparatus, as illustrated in FIG. 13, by forming a spiral discharge groove 105 in the one main surface portion 102a of a circular ring body to exert a pump effect and by discharging oil from the sealing portion 104a, the sealing is achieved.

Figure 13:
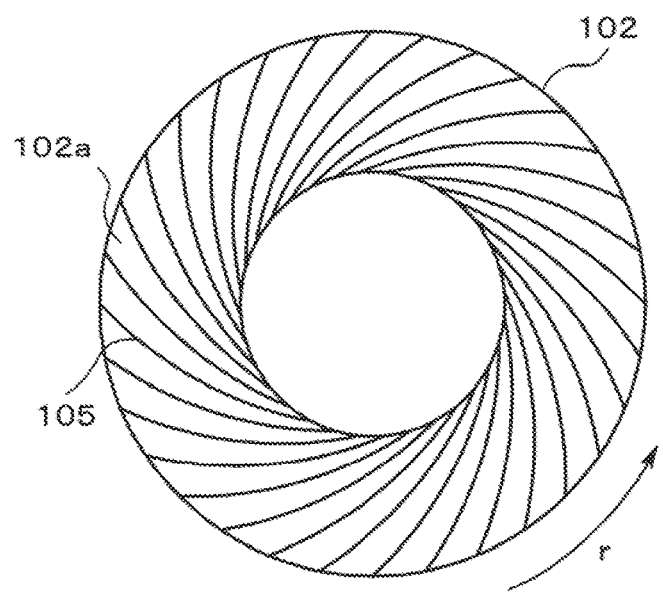

That is, as illustrated by an arrow r in FIG. 13, when the circular ring body 102 rotates relative to the seal lip body 104, the discharge groove 105 formed in the circular ring body 102 of this sealing apparatus, by having a spiral shape, discharges the oil in the outer peripheral side direction, away from the sealing portion 104a.

It should be noted that when the circular ring body 102 and the seal lip body 104 relatively rotate in both directions, the discharge groove 105 is formed in a shape in which spiral shapes in both directions overlap and cross each other.

PRIOR ART LITERATURE

Patent Literature

[Patent Literature 1] Japanese Unexamined Utility Model Application No. H3-57563

SUMMARY

Problem to be Solved by the Disclosure

Incidentally, the formation of the spiral discharge groove 105 on the circular ring body 102 must be done by a cutting process for each circular ring body 102, is extremely cumbersome, and increases the number of processing steps. Forming the discharge groove 105 in a spiral shape in one direction is also cumbersome in terms of processing, and forming a shape in which spirals in both directions overlap and cross each other is even more cumbersome in terms of processing.

Therefore, an objective of the present disclosure is to provide a sealing apparatus capable of achieving sufficient sealing without providing a spiral discharge groove on a circular ring body configuring a sealing portion.

Other objectives of the present disclosure will be apparent from the following description.

Means for Solving the Problem

The above problem is solved by each of the following disclosures.

A sealing apparatus of the disclosure according to claim 1 is a sealing apparatus for sealing a gas or a liquid between two members capable of relative rotation composed of: a circular ring body made of a hard material provided on one of the two members, and an annular seal lip body provided on the other of the two members, made of a flexible material, made coaxial with the circular ring body, and made having sliding contact with the circular ring body to seal, wherein the seal lip body is provided with at least one discharge fin protruding on the side of the gas or the liquid of the sealing portion in sliding contact with the circular ring body and/or on the opposite side of the gas or the liquid, and the discharge fin, at least when the two members are rotating relative to each other, has a surface on a side advancing relative to the circular ring body that composes an inclined surface receding more on the front edge side than the base end side of the discharge fin, and by this inclined surface, the gas or liquid is discharged away from the sealing portion.

The sealing apparatus of the disclosure according to claim 2 has the configuration described in claim 1, wherein the discharge fin is deformed by sliding contact with the circular ring body due to the relative rotation of the two members, and the surface on the side advancing relative to the circular ring body composes an inclined surface receding more on the front edge side than the base end side of the discharge fin.

The sealing apparatus of the disclosure according to claim 3 having the configuration described in claim 1, wherein, even when the two members are relatively stopped, a surface of the discharge fin on the side advancing relative to the circular ring body when they rotate relative to each other composes an inclined surface receding more on the front edge side than the base end side of the discharge fin.

Effect of the Disclosure

According to the present disclosure, it is possible to provide a sealing apparatus capable of achieving sufficient sealing without providing a spiral discharge groove on a circular ring body configuring a sealing portion.

DRAWINGS

Figure 1:
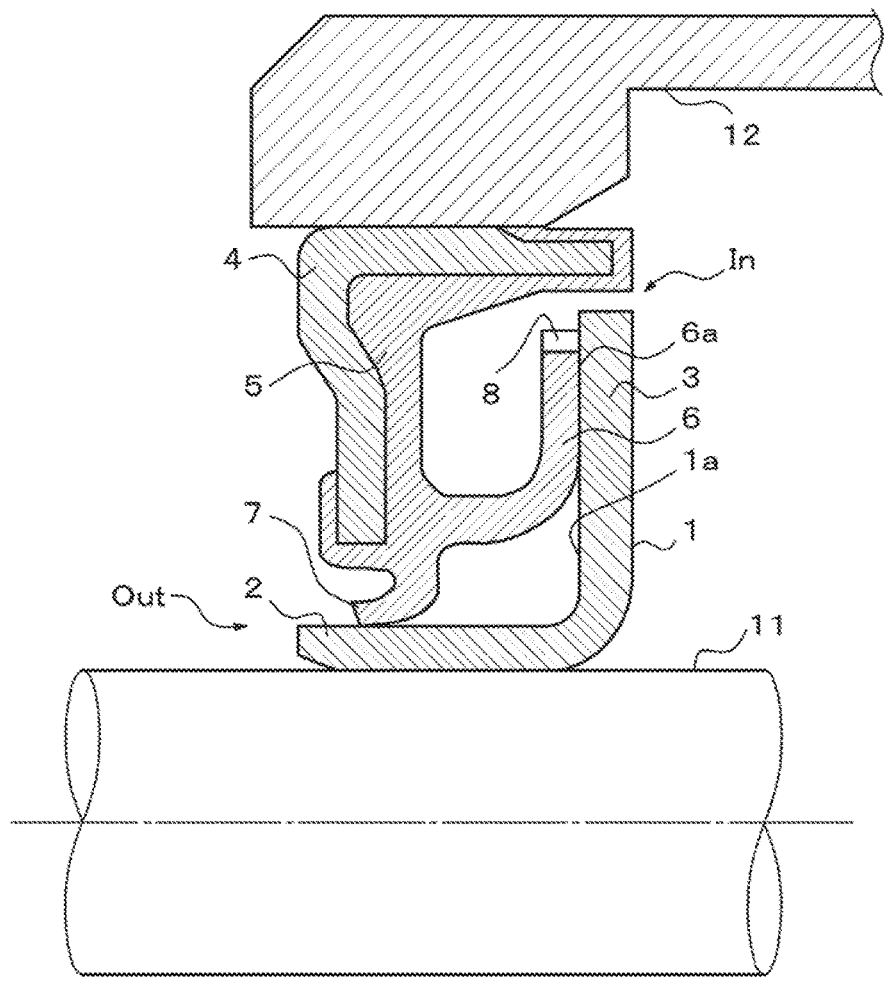
Figure 2:
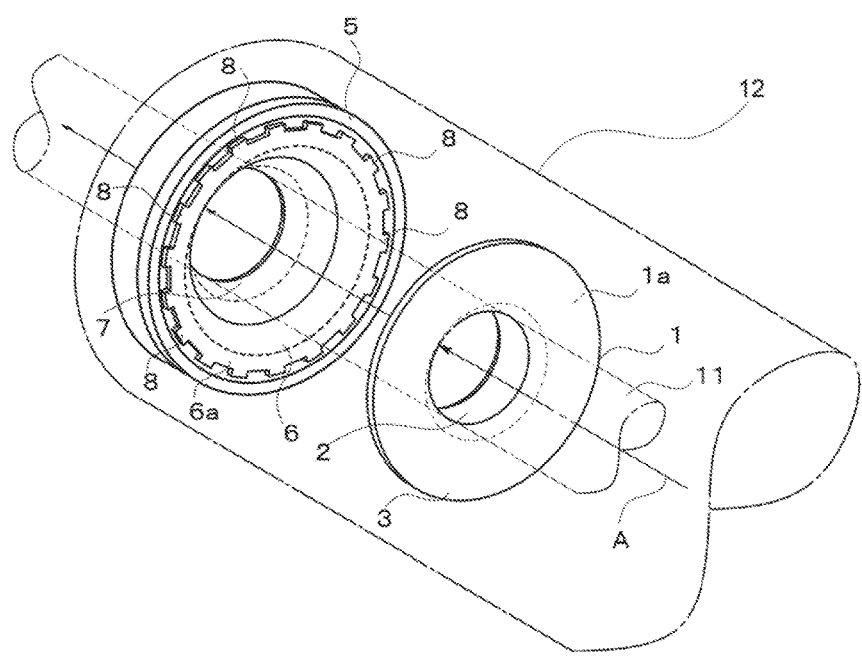
Figure 3:
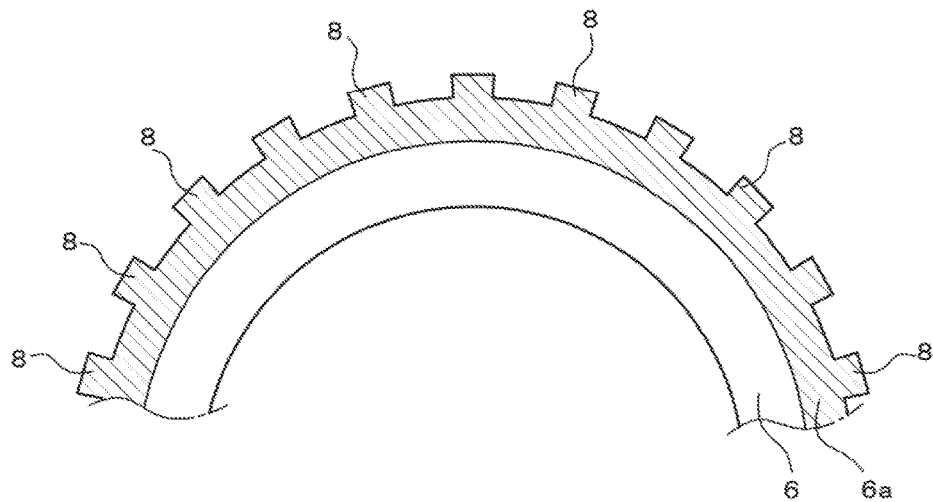
Figure 4:
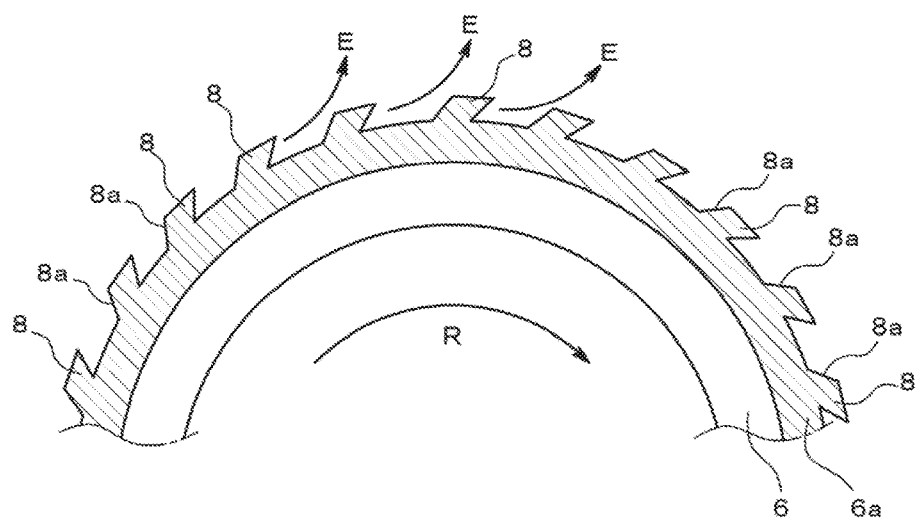
Figure 5:
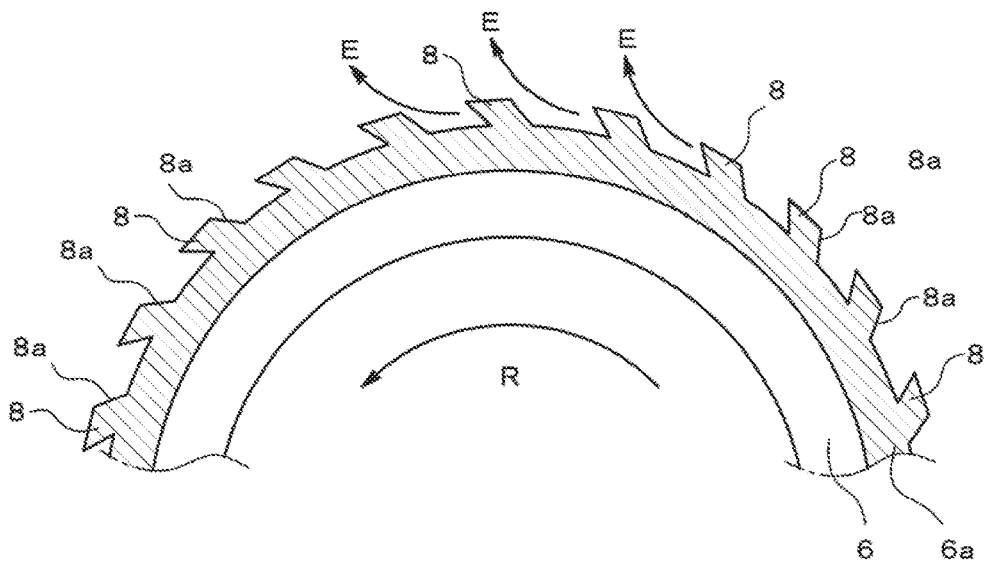
Figure 6:
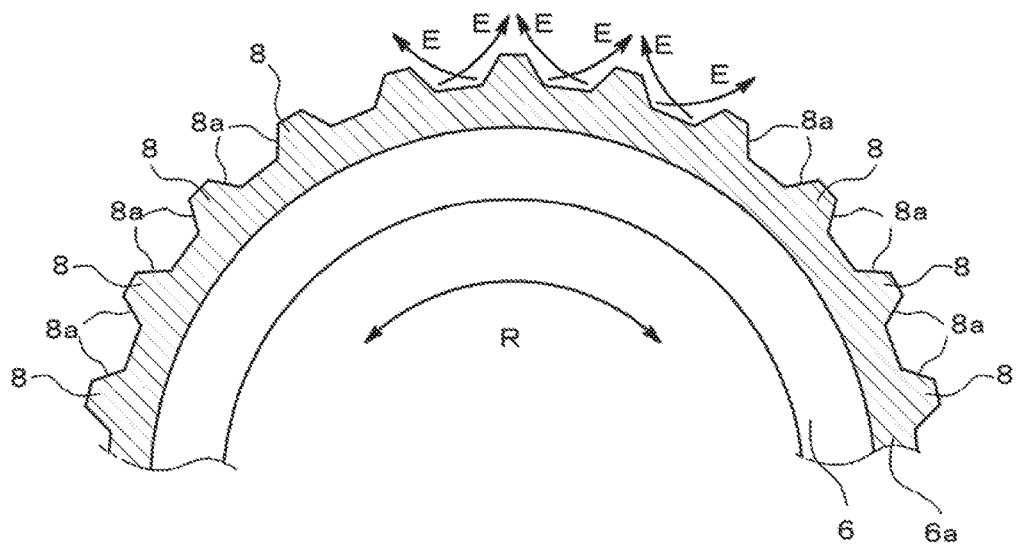
Figure 7:
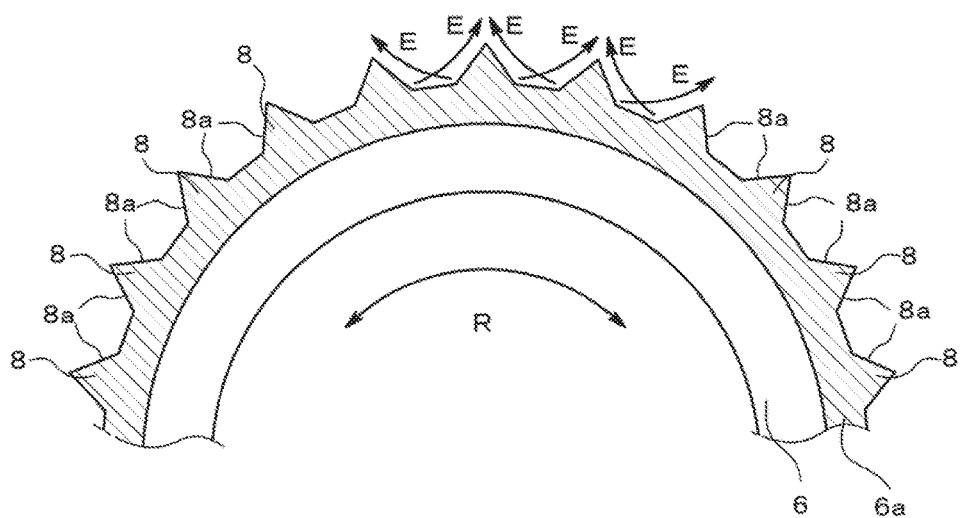
Figure 8:
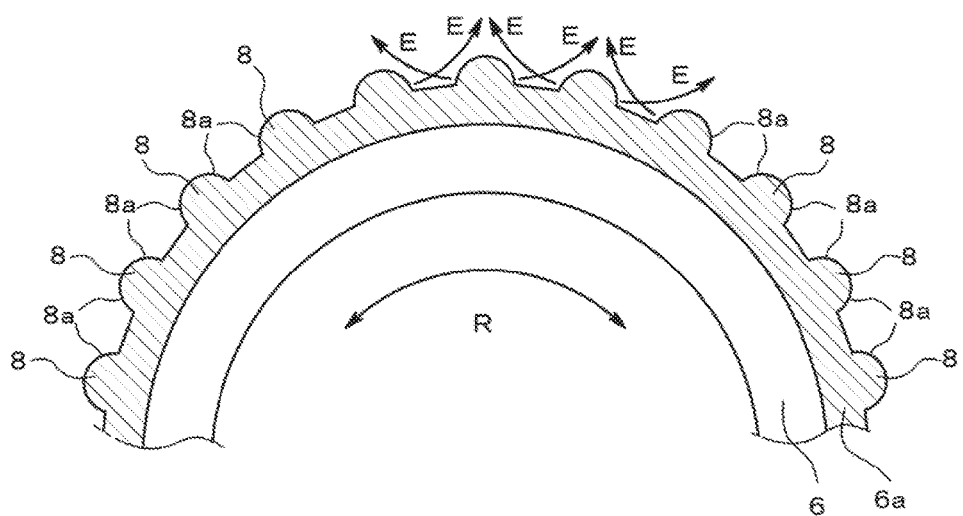
Figure 9:
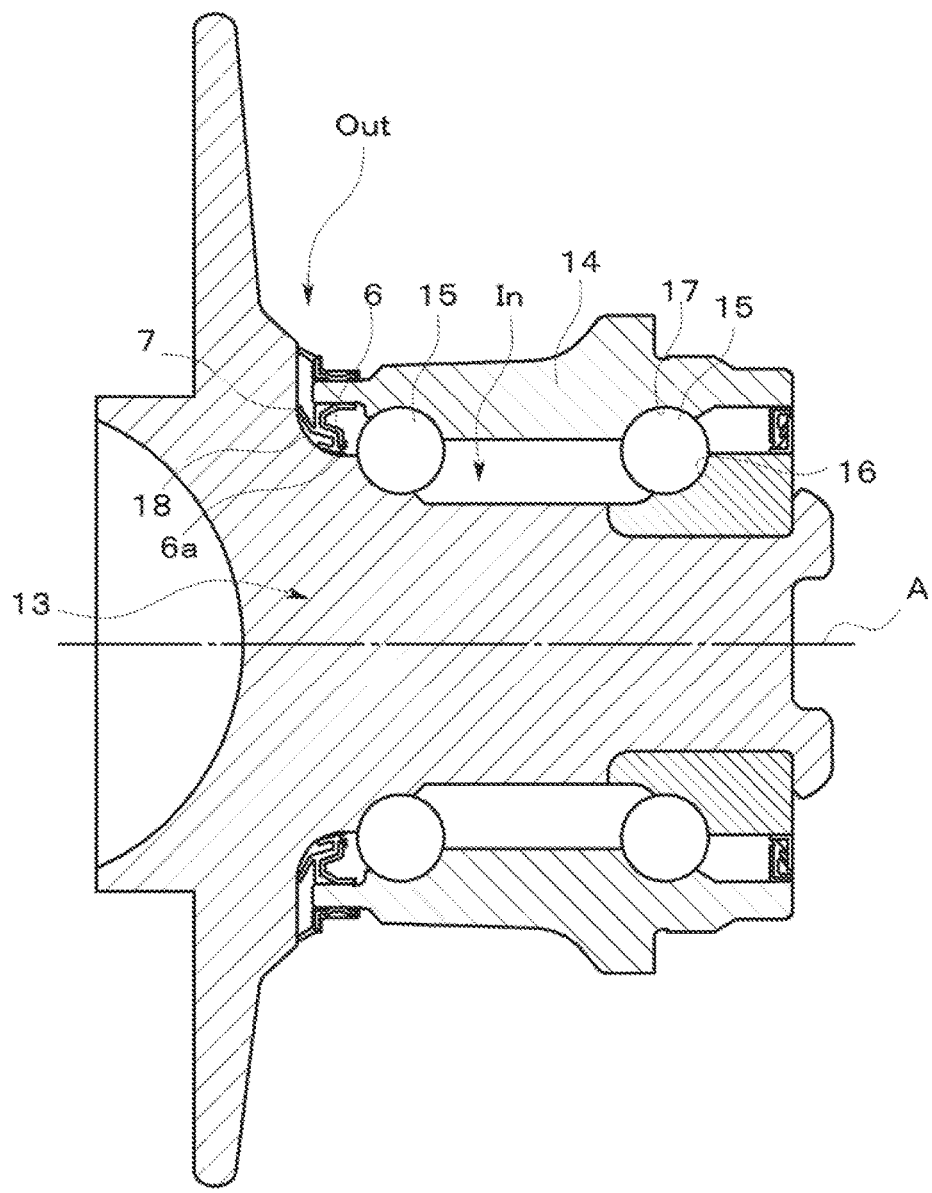
Figure 10:
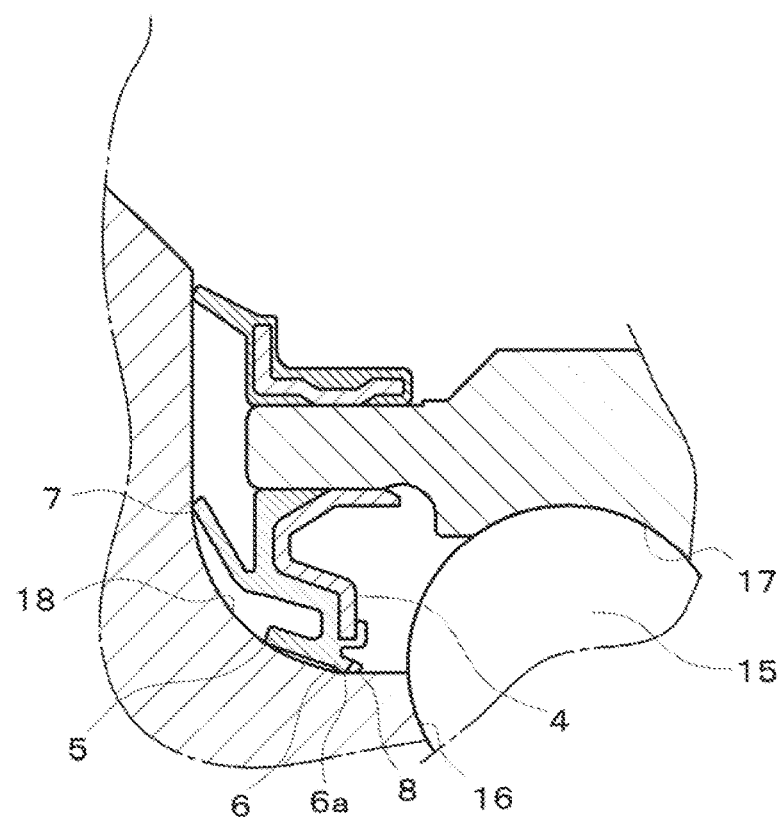
Figure 11:
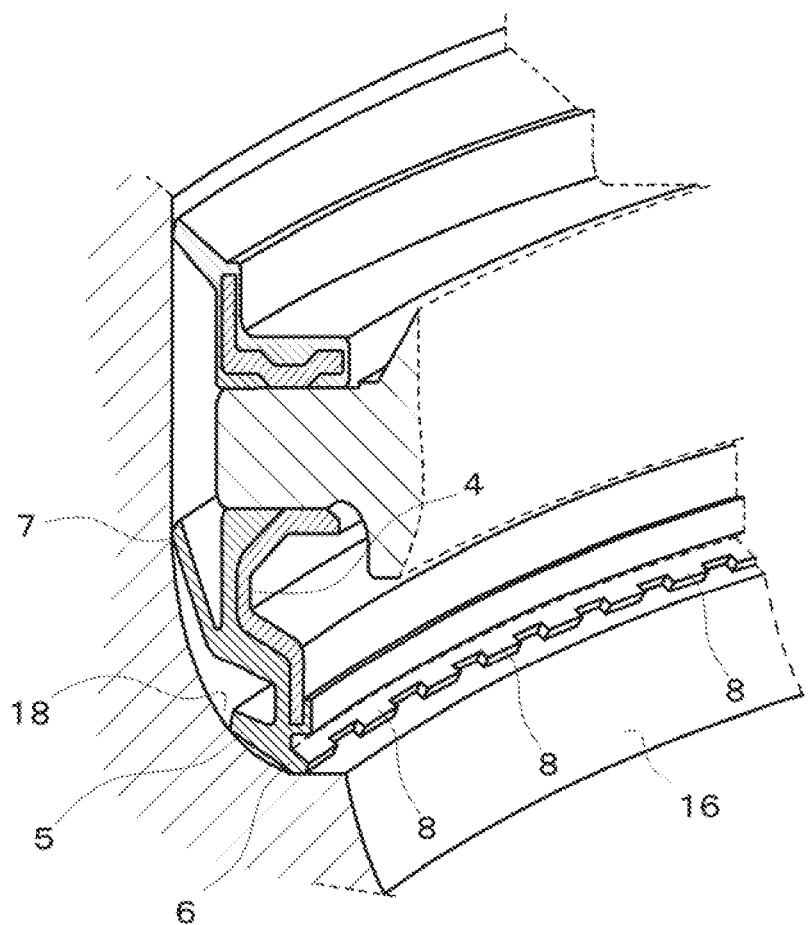

FIG. 1 is a cross-sectional view illustrating a first embodiment of the sealing apparatus according to the present disclosure FIG. 2 is an exploded perspective view illustrating the shape of the seal lip body and the slinger in the first embodiment FIG. 3 is a partial front view illustrating the shape of the seal lip body in the first embodiment FIG. 4 is a partial front view illustrating a state in which the seal lip body in the first embodiment is deformed FIG. 5 is a partial front view illustrating another state in which the seal lip body in the first embodiment is deformed FIG. 6 is a partial front view illustrating a shape of a seal lip body in a second embodiment of the sealing apparatus according to the present disclosure FIG. 7 is a partial front view illustrating another example of the shape of the seal lip body in the second embodiment FIG. 8 is a partial front view illustrating yet another example of the shape of the seal lip body in the second embodiment FIG. 9 is a sectional view illustrating a third embodiment of the sealing apparatus according to the present disclosure FIG. 10 is a partial sectional view illustrating the shapes of a seal lip body and a housing in the third embodiment FIG. 11 is a partial perspective view illustrating the shape of the seal lip body in the third embodiment FIG. 12 is a sectional view illustrating a configuration of a conventional sealing apparatus FIG. 13 is a front view of a main part illustrating the shape of a circular ring body (slinger) of a conventional sealing apparatus

DETAILED DESCRIPTION

Hereinafter, embodiments of the present disclosure will be described with reference to the drawings.

First Embodiment

FIG. 1 is a sectional view illustrating a first embodiment of the sealing apparatus according to the present disclosure.

The sealing apparatus according to the present disclosure is a sealing apparatus for sealing a gas or a liquid between two members which can rotate relative to each other. In this embodiment, as illustrated in FIG. 1, a rotary shaft 11, which is one of two members, and a housing 12, which is the other of the two members, are applied to the apparatus that can relatively rotate. Generally, the housing 12 is fixed to a vehicle body or the like, the rotating shaft 11 is used as a driving force transmission shaft, and oil is filled between the housing 12 and the rotating shaft 11.

FIG. 2 is an exploded perspective view illustrating the shape of the seal lip body and the slinger in the first embodiment.

As illustrated in FIG. 1 and FIG. 2, this sealing apparatus is configured by having a slinger 1 that is a circular ring body fixedly attached on the rotating shaft 11, and an annular seal lip body 6 fixedly attached on the housing 12.

The slinger 1 is configured of a cylindrical portion 2 fixedly attached on the outer peripheral surface of the rotary shaft 11 by a hard material such as a metal, and a disk portion 3 integrally connected to one end side of the cylindrical portion 2.

A seal member support ring 4 is fixedly attached on the inner peripheral portion of the housing 12, which surrounds the rotary shaft 11. The seal member support ring 4 is formed of a hard material such as a metal. On the seal member support ring 4, a seal member 5 formed in an annular shape by a flexible material such as a rubber material or the like is fixedly attached. The seal lip body 6 is integrally connected to the seal member 5.

The seal lip body 6 is connected to the inner peripheral portion of the seal member 5, and is formed in an annular disk shape from the connection portion to the outer peripheral side.

As a material for the seal member 5 and the seal lip body 6, examples include acrylic rubber (ACM), fluorine-based rubber (FKM), nitrile rubber (NBR), hydrogenated nitrile rubber (H-NBR), silicone rubber (VMQ), and the like. Acrylic rubber (ACM) is particularly favorable because it is excellent in oil resistance and heat resistance.

This seal lip body 6 is made coaxial with the slinger 1 and seals by making sliding contact with one main surface portion 1a of the disk portion 3 of the slinger 1. In the seal lip body 6, a portion which makes sliding contact with the one main surface portion 1a of the disk portion 3 is a sealing portion 6a.

In this sealing apparatus, on the outer peripheral side of the seal lip body 6 and the disk portion 3, the space between the inner peripheral portion of the housing 12 and the outer peripheral surface of the rotary shaft 11 is for the machine-in In, and is filled with oil. The sealing portion 6a configured by the seal lip body 6 and the disk portion 3 is an oil sealing portion (oil seal portion).

An annular dust seal lip 7 is provided protruding from the inner peripheral portion of the seal member 5. The dust seal lip 7 is in sliding contact with the outer peripheral surface of the cylindrical portion 2 of the slinger 1. The dust seal lip 7 and the cylindrical portion 2 configure a dust sealing portion for preventing muddy water or the like from entering between the slinger 1 and the seal member 5 from the machine-out Out.

FIG. 3 is a partial front view illustrating the shape of the seal lip body in the first embodiment.

Moreover, in the seal lip body 6, as illustrated in FIG. 1 and FIG. 3, at least one discharge fin 8 is provided to protrude from the outer peripheral side, that is, on the oil side, of the sealing portion 6a, which is in sliding contact with the disk portion 3. The seal member 5 including the seal lip body 6, the dust seal lip 7 and the discharge fin 8 can be integrally made by molding such as injection molding or the like as a whole.

FIG. 4 is a partial front view illustrating a state in which the seal lip body in the first embodiment is deformed.

As illustrated in FIG. 4, at least when the rotary shaft 11 relatively rotates with respect to the housing 12 as illustrated by an arrow R, a surface of the discharge fin 8 of the side advancing relative to the disk portion 3 (not illustrated in FIG. 4) makes as an inclined surface 8a receding more on the front edge side than the base end side of the discharge fin 8.

FIG. 5 is a partial front view illustrating another state in which the seal lip body in the first embodiment is deformed.

That is, as illustrated in FIG. 4 and FIG. 5, the discharge fin 8 is dragged by the disk portion 3 by a sliding contact with the disk portion 3 (not illustrated in FIG. 5) by the relative rotation of the housing 12 with respect to the rotary shaft 11 illustrated by an arrow R, and is deformed according to the direction of the rotation. Moreover, the surface of the discharge fin 8 of the side advancing relative to the disk portion 3 composes an inclined surface 8a receding more on the front edge side than the base end side of the discharge fin 8. As a result, by the inclined surface 8a, the discharge fin 8 discharges the oil rotating following the disk portion 3 in the outer peripheral direction away from the sealing portion 6a, as illustrated by an arrow E in FIG. 4 and FIG. 5.

In this manner, in this sealing apparatus, the sealing is achieved by discharging the oil from the sealing portion 6a by the discharge fin 8. This embodiment can be applied to vehicle parts such as a crankshaft, a transmission, a differential gear, and the like.

It should be noted that the discharge fin 8 may be provided on the inner peripheral side, that is, on the opposite side to the oil side, of the sealing portion 6a. In this case, the discharge fin 8 prevents foreign objects such as muddy water and the like from entering the sealing portion 6a from the machine-out Out as described above. In addition, the discharge fin 8 may be provided on the outer peripheral side, that is, on the gas side to be sealed, of the dust lip 7. In this case, as described above, the discharge fin 8 prevents foreign matters such as muddy water and the like from entering the inside of the dust lip 7 from the machine-out Out.

Second Embodiment

FIG. 6 is a partial front view illustrating a shape of the seal lip body in the second embodiment of the sealing apparatus according to the present disclosure.

As illustrated in FIG. 6, even when the rotary shaft 11 and the housing 12 are relatively stopped (in the initial state), the discharge fin 8 may be in a shape wherein the surface on the side advancing relative to the disk portion 3 when they rotate relative to each other composes the inclined surface 8a, receding more on the front edge side than the base end side of the discharge fin 8.

In this embodiment, as illustrated by arrow R in FIG. 6, regardless of the direction of the relative rotation of the rotary shaft 11 and the housing 12, the surface of the discharge fin 8 on the side advancing relative to the disk portion 3 composes the inclined surface 8a receding more on the front edge side than the base end side of the discharge fin 8. That is, the discharge fin 8 has a trapezoidal shape in which the surface on the side advancing relative to the disk portion 3 and the surface to be on the receding side make an inclined surface 8a having the same shape of front-rear symmetry.

Regardless of the direction of the relative rotation of the rotary shaft 11 and the housing 12, by the inclined surface 8a, the discharge fin 8 discharges the oil rotating following the disk portion 3 in the outer peripheral direction away from the sealing portion 6a as illustrated by an arrow E in FIG. 6.

In this manner, in this sealing apparatus, the sealing is achieved by discharging the oil from the sealing portion 6a by the discharge fin 8.

It should be noted that the surface of the discharge fin 8 on the side advancing relative to the disk portion 3 and the surface on the receding side are asymmetrical in the front-rear direction, and only when the relative rotation of the rotary shaft 11 and the housing 12 is in any one of the directions, the surface on the side advancing relative to the disk portion 3 may compose the inclined surface 8a receding more on the front edge side than the base end side of the discharge fin 8.

FIG. 7 is a partial front view illustrating another example of the shape of the seal lip body in the second embodiment.

As illustrated in FIG. 7, the discharge fin 8 may be in a triangular shape wherein the surface to be on the side advancing relative to the disk portion 3 and the surface to be on the receding side form the inclined surface 8a having a front-rear symmetrical shape of the same shape.

As illustrated by an arrow R in FIG. 7, regardless of the direction of the relative rotation of the rotary shaft 11 and the housing 12, the discharge fin 8 discharges the oil rotating following the disk portion 3 in the outer peripheral direction away from the sealing portion 6a by the inclined surface 8a, as illustrated by an arrow E in FIG. 7.

In this manner, in this sealing apparatus, the sealing is achieved by discharging the oil from the sealing portion 6a by the discharge fin 8.

FIG. 8 is a partial front view illustrating yet another example of the shape of the seal lip body in the second embodiment As illustrated in FIG. 8, the discharge fin 8 may be in a semicircular shape where the surface on the side advancing relative to the disk portion 3 and the surface on the receding side form the inclined surface 8a having a front-rear symmetrical shape of the same shape.

As illustrated by an arrow R in FIG. 8, regardless of the direction of the relative rotation of the rotary shaft 11 and the housing 12, the discharge fin 8 discharges the oil rotating following the disk portion 3 in the outer peripheral direction away from the sealing portion 6a by the inclined surface 8a, as illustrated by an arrow E in FIG. 8.

In this manner, in this sealing apparatus, the sealing is achieved by discharging the oil from the sealing portion 6a by the discharge fin 8. This embodiment can be applied to vehicle parts such as a crankshaft, a transmission, a differential gear, and the like.

In this embodiment also, the discharge fin 8 may be provided on the inner peripheral side, that is, on the opposite side to the oil side of the sealing portion 6a. In this case, the discharge fin 8 prevents foreign objects such as muddy water and the like from entering the sealing portion 6a from the exterior Out as described above. In addition, the discharge fin 8 may be provided on the outer peripheral side, that is, on the gas side to be sealed, of the dust lip 7. In this case, as described above, the discharge fin 8 prevents foreign matters such as muddy water or the like from entering the inside of the dust lip 7 from the exterior Out.

Third Embodiment

FIG. 9 is a sectional view illustrating a third embodiment of the sealing apparatus according to the present disclosure.

As illustrated in FIG. 9, the sealing apparatus of this embodiment is applied to an apparatus wherein a fixed shaft (housing) 13, which is one of two members, and a rotary ring 14, which is the other of the two members, are able to relatively rotate. Generally, the fixed shaft 13 is fixed to a vehicle body or the like, the rotary ring 14 is used as a movable shaft, and oil is filled between the fixed shaft 13 and the rotary ring 14.

A plurality of a steel ball 15 is arranged in a space between the fixed shaft 13 and the rotary ring 14 where oil is filled. These steel balls are sandwiched between a groove 16 provided over the entire circumference of the outer peripheral surface of the fixed shaft 13 and a groove 17 provided over the entire circumference on the inner peripheral surface of the rotary ring 14, and their positions are determined by fitting in these grooves 16 and 17. The fixed shaft 13 and the rotary ring 14 are capable of relative rotation by the plurality of the steel ball 15 rolling between each other along the grooves 16 and 17.

FIG. 10 is a partial sectional view illustrating the shapes of the seal lip body and the housing in the third embodiment.

As illustrated in FIG. 9 and FIG. 10, the sealing apparatus is configured by having a flange portion 18 which is a circular ring body integrally provided on the fixed shaft 13 and an annular seal lip body 6 fixedly attached on the rotary ring 14.

The flange portion 18 is formed of a hard material such as a metal together with the fixed shaft 13 at a position which composes an end of a space filled with oil. The seal member support ring 4 is fixedly attached on the inner peripheral portion of the rotary ring 14 surrounding the flange portion 18. The seal member support ring 4 is made of a hard material such as metal. The seal member 5 formed in an annular shape of a flexible material such as a rubber material is fixedly attached on the seal member support ring 4. The seal lip body 6 is integrally connected to the seal member 5.

As a material for the seal lip body 6, examples include acrylic rubber (ACM), fluorine based rubber (FKM), nitrile rubber (NBR), hydrogenated nitrile rubber (H-NBR), silicone rubber (VMQ), and the like.

This seal lip body 6 is made coaxial with the flange portion 18 and seals by making sliding contact with the flange portion 18. In the seal lip body 6, a portion that makes sliding contact with the flange portion 18 is the sealing portion 6a.

In this sealing apparatus, on the side of the seal lip body 6 and the flange portion 18, where the steel balls 15 are arranged, the space between the outer peripheral portion of the fixed shaft 13 and the inner peripheral surface of the rotary ring 14 is for the machine-in In and is filled with oil. The sealing portion 6a configured by the seal lip body 6 and the flange portion 18 is the oil sealing portion (oil seal portion).

It should be noted that the annular dust seal lip 7 is provided to protrude from the seal member 5. The dust seal lip 7 is in sliding contact with the flange portion 18. The dust seal lip 7 and the flange portion 18 configure the dust sealing portion for preventing muddy water and the like from entering between the flange portion 18 and the seal member 5 from the machine-out Out.

FIG. 11 is a partial perspective view illustrating the shape of the seal lip body in the third embodiment.

Moreover, in the seal lip body 6, as illustrated in FIG. 11, at least one discharge fin 8 is provided protruding from the oil side of the sealing portion 6a in sliding contact with the flange portion 18. The seal member 5 including the seal lip body 6, the dust seal lip 7 and the discharge fin 8 can be integrally made by molding such as injection molding or the like as a whole.

In this discharge fin 8, at least when the rotary ring 14 relatively rotates with respect to the fixed shaft 13 as illustrated by an arrow R, a surface on the side advancing relative to the flange portion 18 composes the inclined surface 8a, which recedes more on the front edge side than the base end side of the discharge fin 8.

That is, the discharge fin 8 is dragged by the flange portion 18 by sliding contact with the flange portion 18 by the relative rotation of the rotary ring 14 with respect to the fixed shaft 13 illustrated by an arrow R and is deformed according to the direction of the rotation. Moreover, the surface of the discharge fin 8 of the side advancing relative to the flange portion 18 composes the inclined surface 8a receding more on the front edge side than the base end side of the discharge fin 8. As a result, the discharge fin 8 discharges the oil in the direction away from the sealing portion 6a by the inclined surface 8a, as illustrated by an arrow E in FIG. 11.

In this manner, in this sealing apparatus, the sealing is achieved by discharging the oil from the sealing portion 6a by the discharge fin 8. This embodiment can be applied to vehicle parts such as hub bearings.

In this embodiment also, the discharge fin 8 may be provided on the opposite side to the oil side of the sealing portion 6a. In this case, the discharge fin 8 prevents the foreign matters such as muddy water or the like from entering the sealing portion 6a from the machine-out Out as described above. In addition, the discharge fin 8 may be provided on the outer peripheral side, that is, on the gas side to be sealed of the dust lip 7. In this case, as described above, the discharge fin 8 prevents foreign matters such as muddy water and the like from entering the inside of the dust lip 7 from the machine-out Out.

DESCRIPTION OF REFERENCE NUMERALS

1 Slinger
1a One main surface portion
2 Cylindrical portion
3 Disk portion
4 Seal member support ring
5 Seal member
6 Seal lip body
6a Sealing portion
7 Dust seal lip
8 Discharge fin
11 Rotary shaft
12 Housing
13 Fixed shaft
14 Rotary ring
15 Steel ball
16 Groove
17 Groove
18 Flange portion
In Machine-in
Out Machine-out

What is claimed is:

1. A sealing apparatus for sealing a gas or a liquid between two relatively rotatable members, comprising:
    a circular ring body made of a hard material provided on one of the two members, the circular ring body including a cylindrical portion and a disk portion extending radially from the cylindrical portion; and
    an annular seal lip body provided on the other of the two members, made of a flexible material, made coaxial with the circular ring body, and made with a sealing portion having sliding contact with the disk portion of the circular ring body to seal, wherein
    the seal lip body is provided with at least one discharge fin in sliding contact with the disk portion of the circular ring body, and
    the discharge fin, at least when the two members are rotating relative to each other, has a surface on a side advancing relative to the circular ring body that composes an inclined surface receding more on the front edge side than the base end side of the discharge fin, and by this inclined surface, the gas or liquid is discharged away from the sealing portion.

2. The sealing apparatus according to claim 1, wherein the discharge fin is deformed by sliding contact with the circular ring body due to the relative rotation of the two members, and the surface on the side advancing relative to the circular ring body composes an inclined surface receding more on the front edge side than the base end side of the discharge fin.

3. The sealing apparatus according to claim 1, wherein, even when the two members are relatively stopped, a surface of the discharge fin on the side advancing relative to the circular ring body when they rotate relative to each other composes an inclined surface receding more on the front edge side than the base end side of the discharge fin.

* * * * *